United States Patent

[11] 3,557,954

| [72] | Inventor | Fredrick M. Welch<br>Oconomowoc, Wis. |
| --- | --- | --- |
| [21] | Appl. No. | 858,554 |
| [22] | Filed | July 16, 1969 |
| [45] | Patented | Jan. 26, 1971 |
| [73] | Assignee | Allis-Chalmers Manufacturing Company<br>Milwaukee, Wis.<br>Continuation of application Ser. No.<br>726,852, May 6, 1968, now abandoned. |

[54] SEWAGE TREATMENT APPARATUS AND METHOD
4 Claims, 4 Drawing Figs.

[52] U.S. Cl. .................................................. 210/17,
210/6, 210/96, 210/151; 261/92
[51] Int. Cl. .................................................. C02c 1/10
[50] Field of Search .......................................... 210/3—8,
17, 96, 150, 151, 194—197; 261/92

[56] References Cited
UNITED STATES PATENTS

| 2,562,510 | 7/1951 | Schlenz ........................ | 210/11—X |
| --- | --- | --- | --- |
| 3,335,081 | 8/1967 | El-Naggar .................... | 210/15 |
| 3,426,899 | 2/1969 | Smith ........................... | 210/96 |

FOREIGN PATENTS

| 935,162 | 8/1963 | Great Britain ................ | 210/17 |
| --- | --- | --- | --- |

Primary Examiner—Michael Rogers
Attorneys—Robert C. Sullivan, Arthur M. Streich and Robert B. Benson ABSTRACT: A sewage treatment apparatus and method including a biological treatment tank having a rotating biological contactor therein, with means for conducting the mixed liquor discharged from the biological treatment tank to a clarifier or settling tank which separates the mixed liquor into secondary sludge and effluent. In various embodiments the secondary sludge, the effluent, and the mixed liquor are respectively recycled in series with a reactivating device to the input of the biological treatment tank. The reactivating device may comprise a rotatable two-phase contactor. Means are provided for measuring the dissolved oxygen content of the mixed liquor and for varying the speed of rotation of the rotating biological contactor as a function of the measured dissolved oxygen content to control the dissolved oxygen content of the mixed liquor. The speed of rotation of the two-phase contactor may also be varied as a function of the measured dissolved oxygen content.

Inventor
Fredrick M. Welch
By Robert C. Sullivan
Attorney

SEWAGE TREATMENT APPARATUS AND METHOD

This application is a continuation of application Ser. No. 726,852, filed May 6, 1968, and now abandoned.

BACKGROUND OF THE INVENTION

1. Field of the Invention

This invention relates to a sewage treatment apparatus and method and more particularly to a sewage treatment apparatus and method utilizing a rotating biological contactor.

2. Description of the Prior Art

It is known in the art of sewage treatment to utilize in the secondary or biological treatment step what may be referred to as a "rotating biological contactor" including a rotating member which is covered with aerobic bacterial slime and which is rotated so as to bring the biological slime on the rotating member alternately into contact with the sewage being treated and with the oxygen-containing atmosphere.

A preferred form of rotating biological contactor is shown by British Pat. No. 935,162 which shows the use of a plurality of disc members extending parallel to the direction of sewage flow and mounted on a shaft, which extends transverse of the direction of sewage flow. The disc members are coated with a bacterial film, and are rotated into alternate contact with atmospheric oxygen and with the sewage to be treated. The bacterial slime on the rotating discs consists principally of aerobic bacteria which have the ability to adsorb, absorb, coagulate and oxidize the undesirable organic constituents of the sewage and to change such into unobjectionable forms of matter. The presence of the biological film or slime on the rotating discs also greatly increases the transfer of oxygen to the sewage through which the discs rotate thereby promoting the multiplication or synthesis of the aerobic bacteria already present in the mixed liquor and in the bacterial film, as well as increasing the ability of the aerobic bacteria to act upon the sewage and reduce it to unobjectionable forms.

SUMMARY OF THE INVENTION

Accordingly, it is an object of this invention to provide an apparatus for and method of sewage treatment of the type using a rotatable biological contactor, in accordance with which undesirable organic constituents of the sewage are removed with increased efficiency.

It is another object of the invention to provide an apparatus for and method of sewage treatment of the type using a rotatable biological contactor in accordance with which an output of the sewage treatment process is reactivated and then recycled to the rotating biological contactor to increase the efficiency of the sewage treatment.

It is still another object of the invention to provide an apparatus for and method of sewage treatment of the type using a rotatable biological contactor in accordance with which the operation of the rotatable biological contactor is regulated according to the physical characteristics of the sewage being treated.

It is a further object of this invention to provide an apparatus for and method of sewage treatment of the type using a rotatable biological contactor in accordance with which an output of the sewage treatment process is recycled to the rotatable biological contactor, with the recycled material being conditioned according to the physical characteristics of the recycled material, or alternatively according to the physical characteristics of the mixed liquor.

In achievement of these objectives, there is provided a sewage treatment apparatus and method including a biological treatment tank having a rotating biological contactor therein, with means for conducting the mixed liquor discharged from the biological treatment tank to a clarifier or settling tank which separates the mixed liquor into secondary sludge and effluent. In various embodiments the secondary sludge, the effluent, and the mixed liquor are respectively recycled in series with a reactivating device to the input of the biological treatment tank. The reactivating device may comprise a rotatable two-phase contactor or other suitable aerating means. Means is provided for measuring the dissolved oxygen content of the mixed liquor and for varying the speed of rotation of the rotating biological contactor as a function of the measured dissolved oxygen content to control the dissolved oxygen content of the mixed liquor. The output of the aerating means in the reactivation tank, as for example, the speed of the two-phase contactor, may also be varied as a function of the measured dissolved oxygen content, preferably by means responsive to a dissolved oxygen probe located in the conditioning tank.

Further objects and advantages of the invention will become apparent from the following description taken in conjunction with the accompanying drawing in which:

DESCRIPTION OF THE PREFERRED EMBODIMENT

Figure 1:
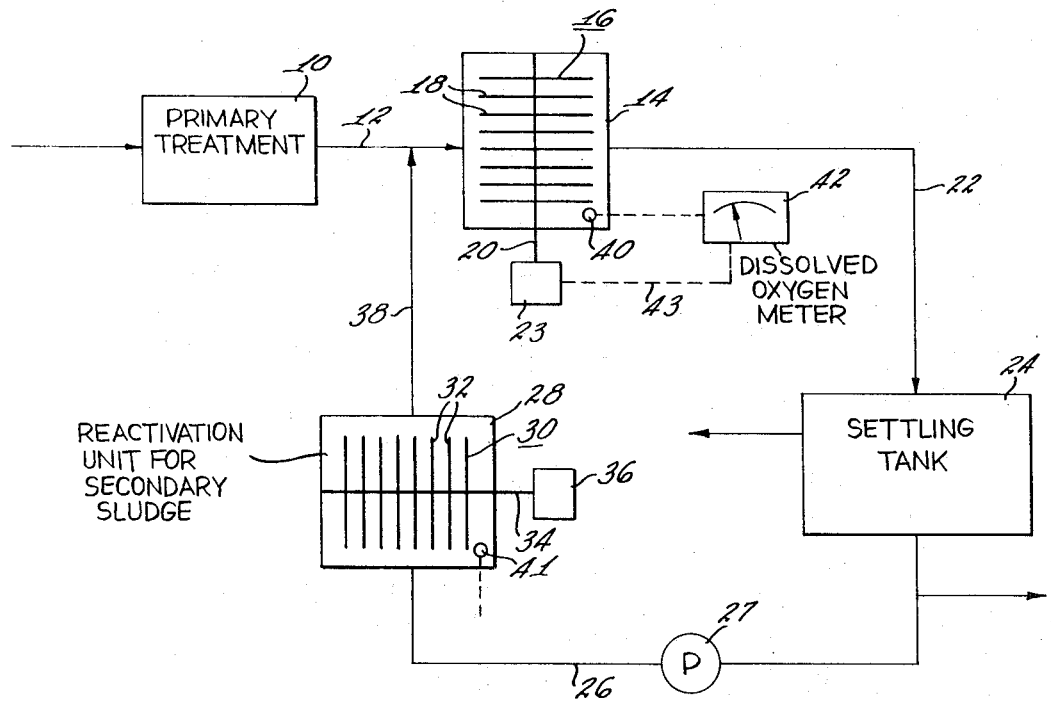
FIG. 1 is a schematic view illustrating the apparatus and method of one embodiment of the invention in accordance with which a portion of the secondary sludge is recycled to the rotating biological contactor after passing through a reconditioning apparatus.

Referring now to FIG. 1, there is indicated the primary treatment step in which untreated raw sewage is fed into a settling tank 10 or the like which permits settling of solids, grit and the like to the bottom of the settling tank. Prior to entering the settling tank, the sewage is conventionally subjected to screening and in some cases to comminution.

What may be referred to as primary treated raw sewage emerges from the primary treatment or settling tank 10 and passes through the conduit or passage 12 where it enters the tank or basin 14 in which a rotating biological contactor assembly generally indicated at 16 is mounted for rotation. The upper portion of tank 14 above the mixed liquor therein is exposed to an oxygen-containing atmosphere. The rotating biological contactor assembly 16 comprises a plurality of discs 18 mounted on a shaft 20. The level of the mixed liquor in the tank 14 is maintained substantially at the height of shaft 20, so that as each disc 18 rotates it is immersed to substantially one-half its diameter in the mixed liquor while the upper half of the diameter of the disc is rotating through the oxygen-containing atmosphere above the level of the mixed liquor. The rotating biological contactor assembly 16 may be of the type shown by British Pat. No. 935,162 and the discs 18 are covered with a bacterial slime which adsorbs, absorbs, coagulates and oxidizes the primary treated raw sewage or mixed liquor in tank 14. The shaft 20 is rotated by a suitable variable speed drive device 23, which may include a variable speed electric motor connected to shaft 20 through a constant ratio gear reduction so that the rate of rotation of discs 18 may be varied as desired.

The mixed liquor is discharged from the biological treatment tank 14 and passes through conduit 22 to the final clarifier or settling tank 24.

In the final clarifier tank 24 there occurs a final settling-out of the biological solids created in the biological treatment tank 14 to produce secondary sludge, and leaving a liquid effluent. A portion of the secondary sludge then passes through a conduit 26 to a reactivation unit 28. A suitable pump 27 may be provided in series with conduit 26 for pumping secondary sludge therethrough. Reactivation unit 28 includes a two-phase contactor device generally indicated at 30 including discs 32 mounted on shaft 34 and a driven by a suitable variable speed drive device 36, which may be similar to variable speed drive device 23. The two-phase contactor including the discs 32 mounted on shaft 34 may be mechanically similar to the rotating biological contactor generally indicated at 16 which rotates in tank 14, except that the rotatable two-phase contactor 30 in the reactivation or rejuvenation unit 28 performs only an aeration function and does not necessarily have a biological slime thereon as in the case of the rotating biological contactor 14. Two-phase contactor devices are shown, for example, by U.S. Pat. Nos. 3,266,786, Grimes et al.; 3,294,378, Grimes; 3,305,224, Piotrowski; 3,325,154, Mc-Donnell; and 3,348,829, Grimes. Any other suitable type of aerating device may be used in the reactivation or rejuvenation tank 28 instead of the rotatable two-phase contactor 30. For example, other types of aerating devices are shown by U.S. Pat. Nos. 1,343,797, Stott et al.; 2,328,655, Lannert; 2,555,201, Nordell; 3,101,321, Austin et al.; 3,109,875, Schramm et al.; and 3,232,866, Morgan.

The activated sludge passing through the reactivation unit 28 is rejuvenated by the aeration process due to the absorption of oxygen by the sludge. The reactivation unit 28 increases the quality of the secondary sludge passing therethrough and improves the ability of the secondary sludge to adsorb, absorb, coagulate and oxidize the organic impurities in the biological treatment tank 14 into which the reactivated secondary sludge passes. The recycling of the reactivated sludge into the biological treatment tank or unit 14 in combination with the rotating biological contactor in tank 14 gives the biological treatment in tank 14 some of the advantages of the activated sludge method in combination with advantages of the rotating biological contactor. Furthermore, the rotating biological contactor assembly in tank 14 provides an additional aeration of the secondary sludge introduced into tank 14 which further increases the efficiency of the process.

The zoogloea, including aerobic bacteria and other biota which constitute the secondary sludge, when introduced into the biological treatment tank 14, add to the total bacterial population which acts on the sewage therein to further adsorb, absorb, coagulate and oxidize the organic impurities contained in the mixed liquor.

The dissolved oxygen content of the mixed liquor is an important indication of the ability of the bacteria and other microorganisms to remove the undesirable organic constituents of the sewage. Accordingly, an important feature of the apparatus and method shown in FIG. 1 is the provision of a dissolved oxygen sensing probe 40 for sensing the dissolved oxygen content of the mixed liquor in biological treatment tank 14. Probe 40 may be mounted so as to be in continuous contact with the mixed liquor in tank 14. A dissolved oxygen meter indicate at 42 is suitably connected to the dissolved oxygen-sensing device or probe 40.

Dissolved oxygen probes and associated meters are commercially available and are well known in the art. For example, the dissolved oxygen probe 40 and meter 42 may be of the type made by Yellow Springs Instrument Co. under the designation "Oxygen Meter Model 54," Probes Models 5420, 5419, and 5418; or by Precision Scientific Co., under the designation "Galvanic Cell Oxygen Analyzer and Probe," Catalog No. 68850, Probe alone Catalog No. 68851; or by Honeywell under the designation "Dissolved Oxygen Sensor," Models 55145-01 and 55145-02.

The dissolved oxygen-sensing probe 40 is preferably located in contact with the mixed liquor in the biological treatment tank 14. However, it may also be positioned in contact with the mixed liquor in the conduit 22 between tank 14 and the clarifier or settling tank 22. The reading of a probe 40 located in conduit 22 may vary somewhat from the reading of a probe 40 located in tank 14, depending upon the flow rate in line 22. The relationship of the reading of a probe at a given location in conduit 22 to the reading of a probe in tank 14 can be empirically determined by measuring the dissolved oxygen by a probe 40 in tank 14 at a given time, and measuring the dissolved oxygen by a probe 40 at the given location in conduit 22 at the same time, and at a given flow rate in conduit 22. This should be repeated for several different flow rates. From this data, a relationship can be determined between the readings of a probe 40 located in the tank 14 and a probe 40 located at some point in conduit 22 between the biological treatment tank 14 and the settling tank 24.

If the reading given by the dissolved oxygen probe 40 on meter 42 indicates that the dissolved oxygen content of the mixed liquor is too low to maintain optimum aerobic biological growth or synthesis, the speed output of the variable speed drive 23 may be increased to increase the speed of rotation of the disc assembly 16 to thereby increase the dissolved oxygen content of the mixed liquor. Some of the dissolved oxygen meters of the types previously mentioned have a built-in temperature compensating device. The speed of rotation of the disc assembly is of the order of magnitude of 10—20 revolutions per minute, but may be adjusted upwardly or downwardly in accordance with the reading of the dissolved oxygen probe 40.

As previously mentioned, the variable speed drive 23 may be, for example, a variable speed electric motor connected to shafts 20 through constant ratio reduction gearing. The electrical output signal from the dissolved oxygen or sensor 40, after being fed through meter 42 which may have a temperature compensating device therein, may be utilized through a suitable control, diagrammatically indicated by the dotted line 43, to automatically vary the speed of the electric drive motor 43 as a function of the measured dissolved oxygen content of the mixed liquor in tank 14, to maintain a proper dissolved oxygen level in the mixed liquor. Alternatively, the variable speed drive 23 may be manually adjusted in accordance with the reading on the dissolved oxygen meter 42 to maintain a proper dissolved oxygen level in the mixed liquor.

The dissolved oxygen content in the mixed liquor in the biological tank 14 may also be adjusted by adjusting the speed of rotation of the variable speed drive 36 which rotates the two-phase contactor disc assembly 30 which rotates in the reactivation tank 28. The speed of rotation of variable speed drive 36 may be adjusted either automatically or manually, as previously described in connection with variable speed drive 23. Variable speed drive 36 may be driven in response to the output signal from probe 40 in tank 14, but preferably is controlled in response to the reading of a separate probe 41 in reactivation tank 28. While probe 41 is preferably located in tank 28, it may also be connected in conduit 38 which leads from tank 28 to biological treatment tank 14, in the same manner as previously described in connection with probe 40.

Figure 2:
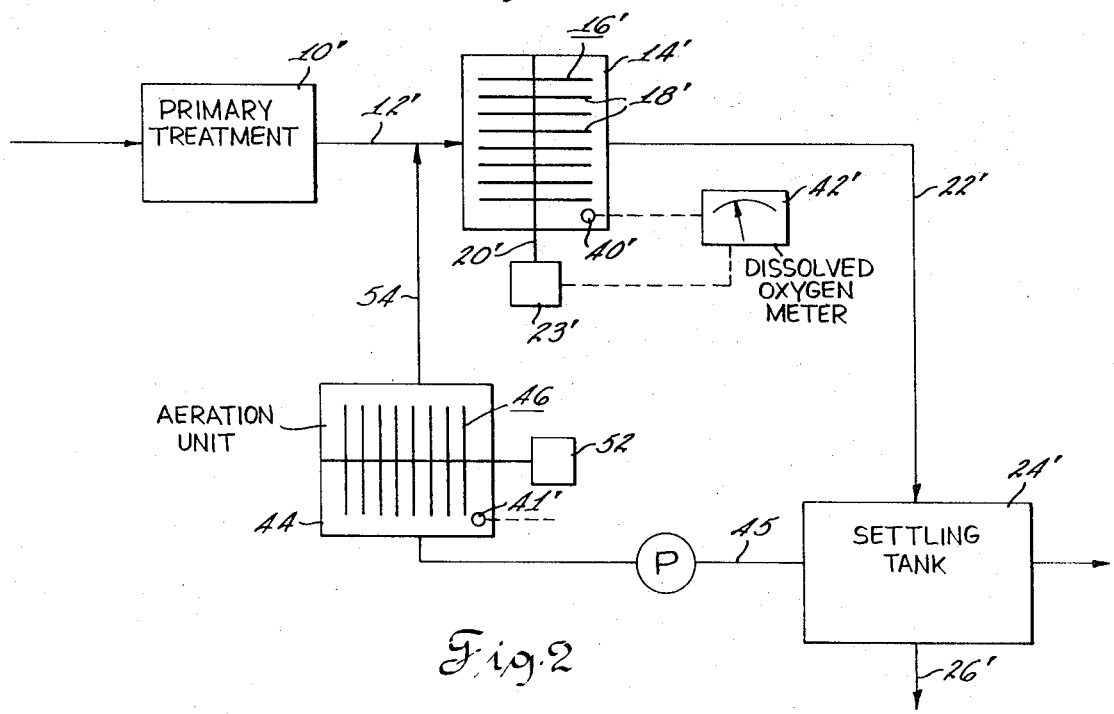
FIG. 2 is a schematic diagram of a modified embodiment of the invention in accordance with which a portion of the effluent from the final clarifier is recycled to the rotating biological contactor after a passing through a reconditioning apparatus.

There is shown in FIG. 2, a modified system and apparatus in accordance with which a portion of the effluent of the final clarifier is recycled to the input of the biological treatment tank 14', in series with an aeration device for the effluent, and further including means for measuring the dissolved oxygen content of the mixed liquor and for varying the speed of rotation of the rotating biological contactor, and for varying the speed of rotation of a two-phase contactor aerating disc assembly, or for adjusting any other aerating device in the aeration tank 44 in order to increase the dissolved oxygen content in the mixed liquor.

Referring now to FIG. 2, there is shown a primary treatment tank 10' which receives raw sewage and acts upon it in the manner described in connection with the primary treatment tank 10 of FIG. 1. The primary treated raw sewage then passes through conduit 12' to the biological treatment tank 14' containing the rotating biological contactor assembly 16' including discs 18' mounted on shafts 20' and driven by variable speed drive 23'. The rotating biological contactor acts on the mixed liquor in tank 14' in the same manner as described in connection with the embodiment of FIG. 1. The mixed liquor then passes from the biological treatment tank 14' by way of conduit 22' to the clarifier or settling tank 24' where the secondary sludge is separated from the effluent. The secondary sludge which leaves the clarifier 24' by way of conduit 26' may or may not, depending upon the requirements, be treated in the same manner and recycled in the same manner described in connection with the secondary sludge of the embodiment of FIG. 1. A portion of effluent leaves the clarifier or settling tank 24' by way of conduit 45 and passes to an aeration tank 44 which may contain therein any of the various types of aeration devices described in connection with the embodiment of FIG. 1 but which is preferably provided with the two-phase disc type contactor assembly generally indicated at 46 similar to that described in connection with the embodiment of FIG. 1, and which is driven by a variable speed drive 52. The effluent in passing through the aerating tank 44 has oxygen added thereto by the two-phase contactor assembly 46 which is substantially half immersed in the effluent, with the upper portion of the assembly rotating through an oxygen-containing atmosphere, whereby oxygen is transferred to the effluent on the discs.

By aerating the effluent in aerating tank 44 as just described, the aerated effluent which then passes by conduit 54 into the biological treatment chamber or tank 14' thereby increases the dissolved oxygen in the mixed liquor in treatment tank 14', to thereby increase the growth of and promote the action of sewage-consuming aerobic bacteria in tank 14'.

As in the embodiment of FIG. 1, a dissolved oxygen-sensing probe 40' is immersed in the mixed liquor in the biological treatment tank 14' or in conduit 22' and is suitably connected to a meter device 42'.

Upon the detection of a dissolved oxygen content in the mixed liquor which is too low, the variable speed drive 23' for the rotating biological contactor assembly 16', which may be similar to variable speed drive 23, may be either automatically or manually adjusted as previously described to increase the speed of the rotating biological contactor 16' to thereby increase the dissolved oxygen content of the mixed liquor. Alternatively upon the detection of a dissolved oxygen content in the mixed liquor which is too low, the variable speed drive 52 for the two-phase rotating disc aerating device 46 in the aerating tank 44 may be adjusted to increase the speed of the aerating discs 46. This will increase the amount of oxygen in the effluent which enters tank 14' by way of conduit 54, thereby promoting growth of aerobic bacteria in tank 14', and increasing the efficiency with which undesirable organic constituents are converted to unobjectionable components. The variable speed drive 52 may be similar to the previously described variable speed drives 23, 23' and 36 and may be controlled either automatically or manually in the manner previously described either in response to dissolved oxygen sensing probe 40' for the mixed liquor, or in response to dissolved oxygen sensing probe 41' in aeration tank 44. As previously explained, the probe 41' may also be located in conduit 54 leading from tank 44 to tank 14'.

While it is preferred to use the rotating disc type two-phase contactor 46 for aerating the effluent in reactivation tank 44, other types of aerating devices may be used, as described in connection with the embodiment of FIG. 1, and suitably controlled by the output signal from a dissolved oxygen-sensing probe.

Figure 3:
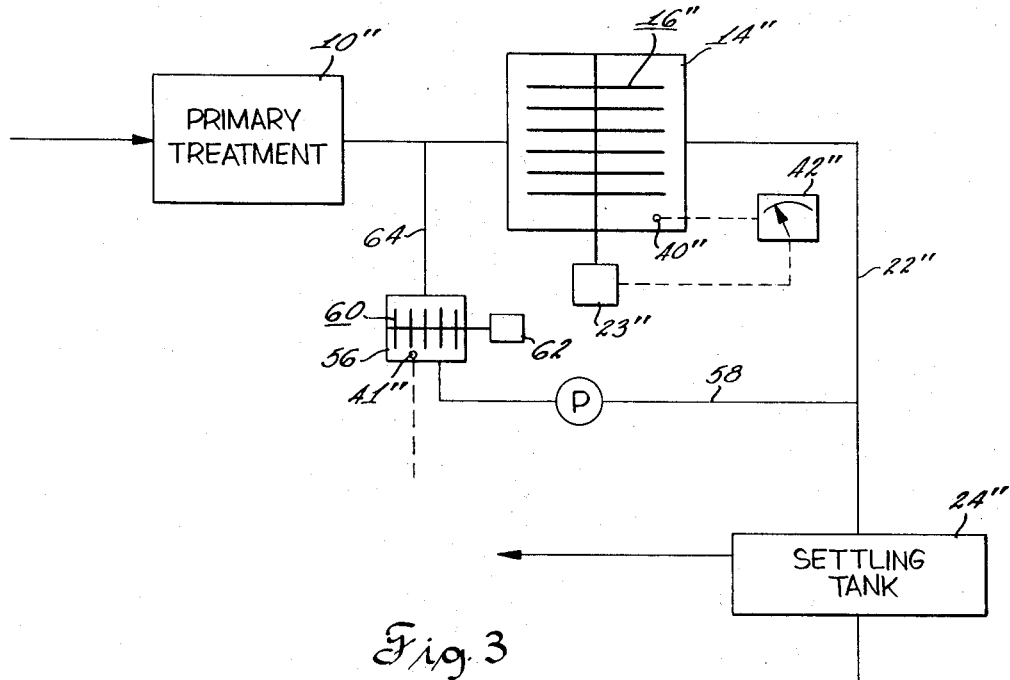
FIG. 3 is a schematic diagram of a still further modified embodiment of the invention in accordance with which a portion of the mixed liquor is recycled from the output of the rotating biological contactor back to the input thereof after passing through a reconditioning apparatus.

There is shown in FIG. 3, still another embodiment of the invention in which a portion of the mixed liquor is recycled back to the intake of the biological treatment tank in series with a reactivation unit, with means being provided for adjusting the speed of the rotating biological contactor in the biological treatment tank 14" to increase the dissolved oxygen content of the mixed liquor, and also with means for adjusting the speed of the rotating two-phase contactor in the reactivation unit to increase the dissolved oxygen content in the mixed liquor as detected by a dissolved oxygen content probe.

Referring now to FIG. 3, there is shown a primary treatment tank 10" which receives the raw sewage and acts upon it in the same manner as previously described in connection with the embodiments of FIGS. 1 and 2, the primary treated raw sewage then passing to the biological treatment tank 14" which includes the rotating biological contactor 16", driven by variable speed drive means 23", which acts upon the mixed liquor in treatment tank 14" in the same manner as previously described in the embodiments of FIGS. 1 and 2. The variable speed drive means 23" may be similar to those previously described. The mixed liquor then passes from tank 14" by way of conduit 22" the final clarifier or settling tank 24" where it is separated into its components of secondary sludge and effluent. A portion of the mixed liquor is diverted from conduit 22" and passes through conduit 58 to a reactivation unit 56 which may be similar to the reactivation unit 28 described in connection with the embodiment of FIG. 1. Reactivation unit 56 may include a two-phase contactor generally indicated at 60, driven by a variable speed drive 62 which may be similar to the variable speed drives previously described. Other types of aerating devices such as those described in connection with the embodiment of FIG. 1 may be used instead of the rotatable disc type two-phase contactor 60 to cause the increase of dissolved oxygen in the mixed liquor. The aerated mixed liquor passes from the reactivation unit 56 by way of conduit 64 to the inlet of the biological treatment tank 14" where the aerated recycled mixed liquor increases the oxygen content of the total mixed liquor in treatment tank 14".

As previously described, the degree of oxygen content of the mixed liquor within the treatment tank 14" may be measured by means of dissolved oxygen sensing probe 40" which provides a reading or indication on the connected meter 42''', and the variable speed drive 23" of the rotating biological contactor may be either automatically or manually adjusted to vary the speed of the rotating biological contactor 16" to control the dissolved oxygen content of the mixed liquor, in the manner previously described; or alternatively, the variable speed drive 62 of the reactivation unit 56 may be adjusted in the same manner to vary the speed of the rotating two-phase contactor disc assembly 60 in the reactivation unit tank 56 to thereby control the dissolved oxygen content in the mixed liquor through the reactivation unit 56; or both of the speed adjustments just described may be made.

In any of the embodiments of FIGS. 1, 2 and 3, a different type of reactivating or aerating device than the two-phase contactor 30 (FIG. 1), 46 (FIG. 2) or 60 (FIG. 3) may be used, such as those shown in the patents hereinbefore listed, and such devices may be o controlled in response to a dissolved oxygen probe located in either the biological treatment tank or the output line thereof or in the reactivation or aerating tank 28 (FIG. 1), 44 (FIG. 2), 56 (FIG. 3) or the output line thereof.

In any of the various embodiments of FIGS. 1, 2, 3 only one output (secondary sludge, effluent, or mixed liquor) would be fed through a given conditioning device (reactivation or aeration) at a given time. However, suitable piping and valve connections may be provided to permit selectively recycling any one of the aforementioned outputs through the same conditioning unit.

Figure 4:
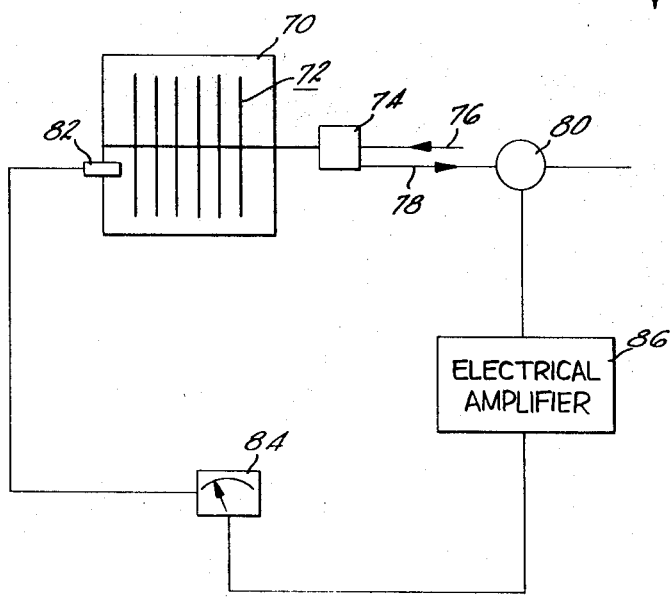
FIG. 4 is a schematic diagram of a modified system for controlling the speed of a rotating biological contactor as a function of the measured dissolved oxygen content of the mixed liquor.

There is shown in FIG. 4 a modified variable speed drive arrangement which may be used to drive a rotating biological contactor in response to the output signal from a dissolved oxygen-sensing probe.

There is shown a biological treatment tank 70 having mounted therein a disc type rotatable biological contactor generally indicated at 72. The rotatable biological contactor 72 is driven by a hydraulic motor 74 which is supplied with hydraulic fluid through input conduit 76, and discharges hydraulic fluid through output conduit 78. An electrical servomotor 80 controls an adjustable valve in the discharge line 78. A dissolved oxygen sensing probe 82 is immersed in the mixed liquor in tank 70 and feeds an electrical signal to the dissolved oxygen meter 84 which provides a reading of the dissolved oxygen sensed by probe 82. The signal from the probe 82 is fed to an electrical amplifier 86, preferably through the meter 84 which may have a temperature-compensating device therein. The electrical output from amplifier 86 is fed to the electrical servomotor 80 which adjusts the position of the valve in hydraulic discharge line 78 to thereby control the flow of hydraulic fluid in line 78 and hence control the speed of rotation of hydraulic motor 74 in response to the dissolved oxygen content of the mixed liquor in tank 70, as sensed by sensing probe 82.

An arrangement similar to that shown in FIG. 4 may also be used for controlling the two-phase contactors 30 (FIG. 1), 46 (FIG. 2) or 60 (FIG. 3).

It should also be noted that in addition to controlling the dissolved oxygen in the mixed liquor, variation in the speed of rotation of the rotating biological contactor discs shown in the various FIGS. controls the degree of agitation and mixing within the biological treatment tank. The rotating biological contactor discs rotate relatively slowly as for example, 5 r.p.m., but may rotate at higher rates, such as 40 r.p.m.

While there have been shown and described particular embodiments of the invention, it will be obvious to those skilled in the art that various changes and modifications may be made therein without departing from the invention, and therefore, it is aimed to cover all such changes and modifications as fall within the true spirit and scope of the invention.

I claim:

1. A sewage treatment apparatus comprising a biological treatment tank, a movable biological contactor means mounted for movement whereby a given surface area of said contactor means alternately contacts the mixed liquor in said treatment tank and an oxygen-containing atmosphere, variable speed drive means for moving said contactor means, means for measuring the dissolved oxygen content of the mixed liquor, and means for controlling said variable speed drive means to cause movement of said contactor means as a function of the measured dissolved oxygen content of the mixed liquor whereby to control the dissolved oxygen content of said mixed liquor.

2. A sewage treatment apparatus as defined in claim 1 in which said biological contactor means is mounted for rotation.

3. The method of sewage treatment which comprises the steps of passing sewage through a biological treatment tank, moving a biological contactor means whereby a given surface area of said contactor mean alternately contacts the sewage in said tank and an oxygen-containing atmosphere, measuring the dissolved oxygen content of the resulting mixed liquor, and controlling the rate of movement of said contactor as a function of the measured dissolved oxygen content of said mixed liquor whereby to control the dissolved oxygen content of said mixed liquor.

4. The method defined in claim 3 in which said biological contactor means is rotatably moved.